(12) United States Patent
Ushiyama et al.

(10) Patent No.: US 9,177,231 B2
(45) Date of Patent: Nov. 3, 2015

(54) IMAGE RECORDING APPARATUS, IMAGE RECORDING METHOD, AND STORAGE MEDIUM

(71) Applicant: CANON KABUSHIKI KAISHA, Tokyo (JP)

(72) Inventors: Takayuki Ushiyama, Kawasaki (JP); Yoshitomo Marumoto, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/327,303

(22) Filed: Jul. 9, 2014

(65) Prior Publication Data

US 2015/0015625 A1  Jan. 15, 2015

(30) Foreign Application Priority Data

Jul. 11, 2013  (JP) ................. 2013-145803

(51) Int. Cl.
| | |
|---|---|
| B41J 2/205 | (2006.01) |
| B41J 29/38 | (2006.01) |
| G06K 15/10 | (2006.01) |
| B41J 2/21 | (2006.01) |

(52) U.S. Cl.
CPC ............. *G06K 15/107* (2013.01); *B41J 2/2132* (2013.01)

(58) Field of Classification Search
USPC ................. 347/9, 12, 14, 15, 41, 107
See application file for complete search history.

(56) References Cited

U.S. PATENT DOCUMENTS

| | | | | |
|---|---|---|---|---|
| 7,731,346 B2 * | 6/2010 | Koike et al. | ................. | 347/100 |
| 7,878,613 B2 * | 2/2011 | Nishikori et al. | ............... | 347/15 |
| 7,922,287 B2 * | 4/2011 | Noguchi | ......................... | 347/40 |
| 2011/0234728 A1 * | 9/2011 | Aoki et al. | .................... | 347/102 |

FOREIGN PATENT DOCUMENTS

JP  H01-113249 A  5/1989

\* cited by examiner

*Primary Examiner* — Hai C Pham
(74) *Attorney, Agent, or Firm* — Canon U.S.A., Inc. IP Division

(57) ABSTRACT

In a predetermined mask pattern, recording permitted pixels are disposed such that the average of the numbers of the recording permitted pixels in a unit in a first area is smaller than the number of the recording permitted pixels in a unit in a second area that is located toward an end side as compared to the first area in a direction corresponding to an array direction of nozzles.

14 Claims, 15 Drawing Sheets

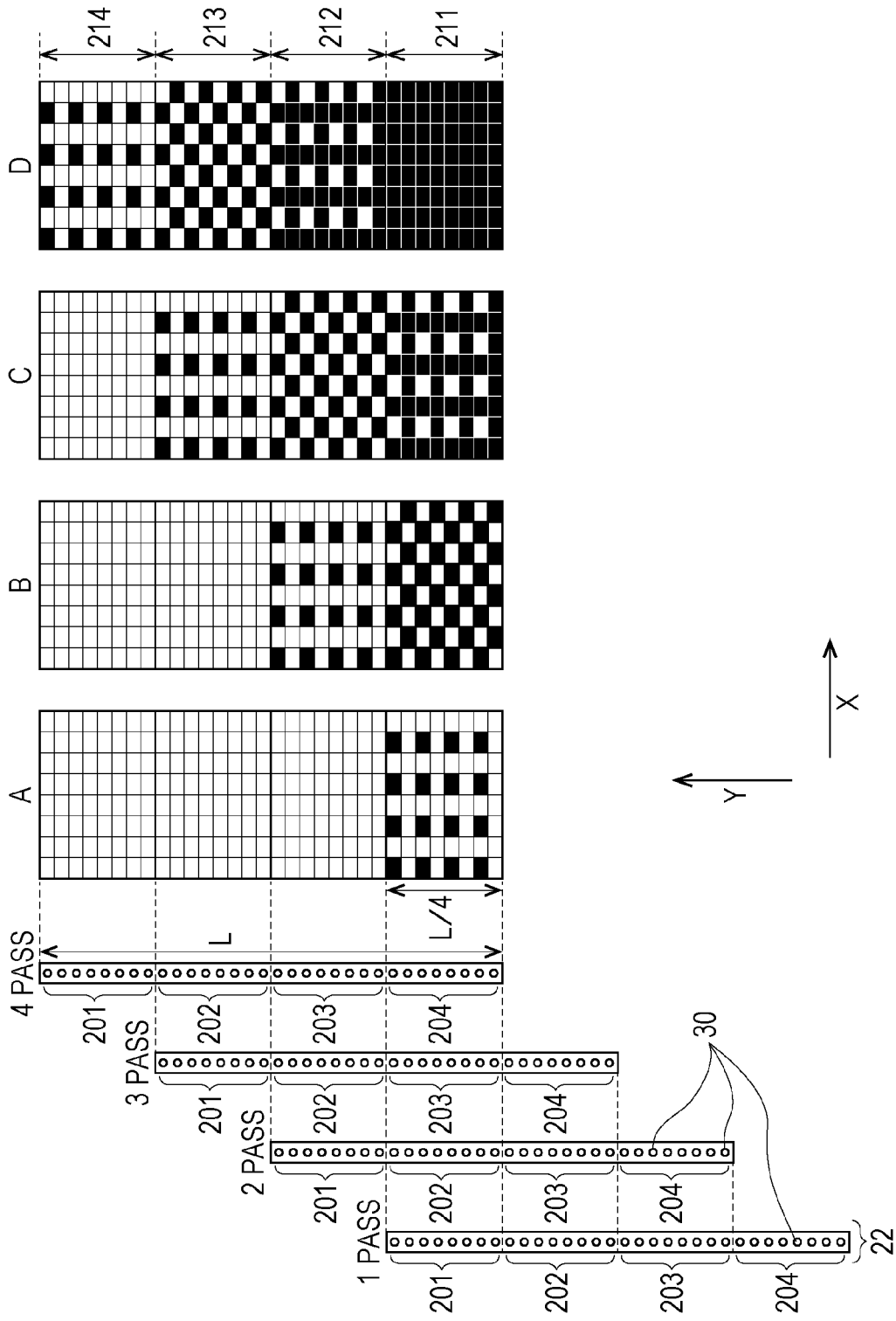

IMAGE RECORDING APPARATUS, IMAGE RECORDING METHOD, AND STORAGE MEDIUM

BACKGROUND

1. Field

The present invention relates to image recording apparatuses, image recording methods, and storage media.

2. Description of Related Art

Image recording apparatuses that record an image by repeating a recording scan and a sub-scan are known. In the recording scan, ink is ejected while a recording head having a plurality of recording nozzles for ejecting ink arrayed therein is moved in a scanning direction relative to a unit area of a recording medium. In the sub-scan, the recording medium is conveyed in a conveying direction that intersects with the scanning direction. In such image recording apparatuses, a so-called multipass recording method is employed, through which an image is formed by carrying out the recording scan a plurality of times on a unit area on the basis of divided image data formed by mask patterns in which recording permitted pixels, for which recording is permitted to be carried out through respective scans, are disposed.

In addition, in recent years, print materials of a variety of uses have been produced through ink jet recording, and various types of inks and recording media have been used accordingly. Japanese Patent Laid-Open No. 1-113249 discloses a method in which, with the use of ink containing a resin emulsion and a recording medium having poor water absorbency, the ink is heated when the ink lands on the recording medium so as to cause the resin emulsion to form a film and coloring materials contained in the ink is fixed to the recording medium.

However, if an image is recorded with the use of the ink and the recording medium as disclosed in Japanese Laid-Open Patent No. 1-113249, stripe-like unevenness (hereinafter, referred to as bond stripes) may occur in the recorded image at a boundary portion between recording scans, and the image quality may thus deteriorate.

Hereinafter, this problem will be described in detail.

FIGS. 1A to 1C are diagrams for describing the process of recording an image through a multipass recording method by using ink containing a resin emulsion and a recording medium having poor water absorbency. Here, a mode in which the image is completed through four instances of the recording scan will be described as an example.

FIG. 1A is a schematic diagram of an image surface obtained when the ink is ejected through the recording scan onto an area A of the recording medium. Dots 700 are formed in the area A upon the ink being ejected. Since the recording medium has poor water absorbency, the dots 700 are fixed so as to cover the surface of the recording medium.

FIG. 1B is a schematic diagram of the image surface obtained when the recording medium is conveyed in a Y direction after the recording scan illustrated in FIG. 1A and the ink is ejected onto an area B adjacent to the area A at a downstream side thereof in the Y direction. Here, films of the resin emulsion forming surface layers of the dots 700 are generally known to have high critical surface tension. The critical surface tension refers to a value unique to a solid surface, and indicates how wettable a liquid droplet is when the liquid droplet is applied onto the solid surface. It should be noted that a solid surface having high critical surface tension corresponds to a solid surface with which the applied liquid droplet is highly wettable. Therefore, if ink is ejected to a position that makes contact with the dot 700, the ink easily wets to spread over the dot 700 having high critical surface tension and is thus pulled in directions indicated by arrows in FIG. 1B. Meanwhile, dots 701 of the ink ejected to positions that do not make contact with the previously formed dots 700 are fixed without being pulled toward any particular direction.

FIG. 1C is a schematic diagram of an image surface obtained when the ink droplets ejected through the recording scan illustrated in FIG. 1B are fixed on the recording medium. As described above, force that pulls to a particular direction does not act on the dots 701 when the dots 701 are to be fixed, and thus the dots 701 are fixed at positions at which the ink droplets have been applied. Meanwhile, dots 702 are subjected to the force acting in the directions indicated by the arrows in FIG. 1B when the dots 702 are to be fixed, and thus the dots 702 are fixed at positions that are offset toward a side 1000 of the area A from the positions at which the ink droplets have been applied. As a result, a black stripe appears at the side 1000 of the area A and a white stripe appears at a side 1001 of the area B in a boundary portion between the area A and the area B on the recording medium, which corresponds to the boundary portion between the recording scans, and the image quality thus deteriorates.

It should be noted that the above problem occurs more notably when ink containing a resin emulsion is used.

SUMMARY

This application is directed to providing an image recording apparatus, an image recording method, and a storage medium that can suppress the occurrence of bond stripes.

An example of the presently claimed subject matter is an image recording apparatus configured to record an image. The image recording apparatus includes a recording head including a plurality of nozzles in a nozzle row for ejecting ink arrayed in an array direction, a scanning unit configured to cause the recording head to relatively scan a unit area on a recording medium a plurality of times, in a scanning direction that intersects with the array direction, a conveying unit configured to convey the recording medium, in a conveying direction that intersects with the scanning direction, by a distance corresponding to a length of each of a plurality of nozzle groups, which are formed by dividing the plurality of nozzles along the array direction, along the array direction, in an interval of the plurality of times the recording head is caused to scan by the scanning unit, a generating unit configured to generate recording data, used to eject ink from each of the plurality of nozzle groups during each of the plurality of times of the scan on the unit area, from image data corresponding to the unit area on the basis of a plurality of mask patterns corresponding to the respective times of the scans and to the plurality of nozzle groups and each including a recording permitted pixel that permits recording and a recording non-permitted pixel that does not permit recording, and a controlling unit configured to control the ink to be ejected onto the unit area from the recording head on the basis of the recording data. In a case in which a recording permitted pixel group formed by a plurality of adjacently disposed recording permitted pixels and a recording permitted pixel that is not adjacent to any other recording permitted pixel each form a single unit in a mask pattern, an average of the numbers of the recording permitted pixels in the unit in a first area of a predetermined mask pattern among the plurality of mask patterns is less than an average of the numbers of the recording permitted pixels in the unit in a second area that is located at an end side of the predetermined mask pattern along a direction corresponding to the array direction of the predetermined mask pattern and that has the same size as the first area along the direction corresponding to the array direction.

Further features of the presently claimed subject matter will become apparent from the following description of exemplary embodiments with reference to the attached drawings.

BRIEF DESCRIPTION OF THE DRAWINGS

FIG. 7 is a diagram for describing a typical multipass recording method.

DETAILED DESCRIPTION

First Exemplary Embodiment

Hereinafter, a first exemplary embodiment will be described in detail.

Figure 1A:
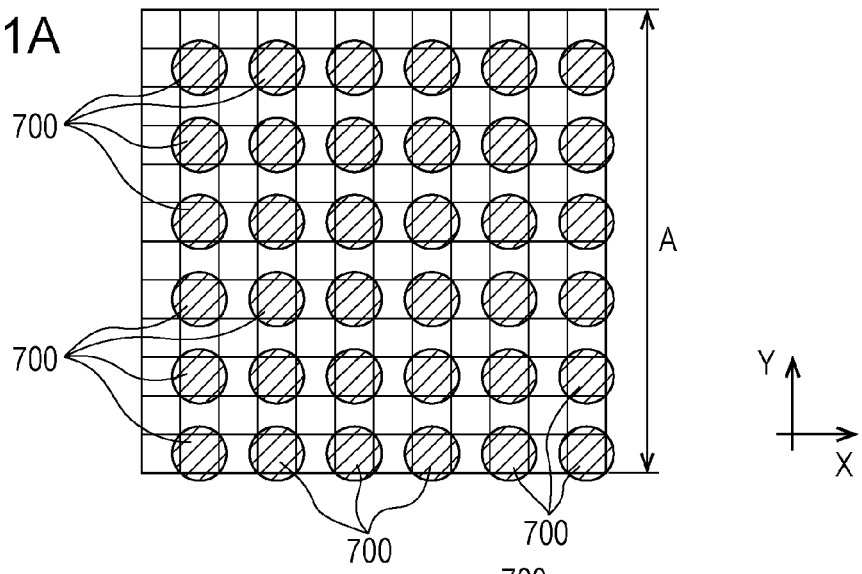
FIGS. 1A to 1C are diagrams for describing the process in which bond stripes appear.
Figure 1B:
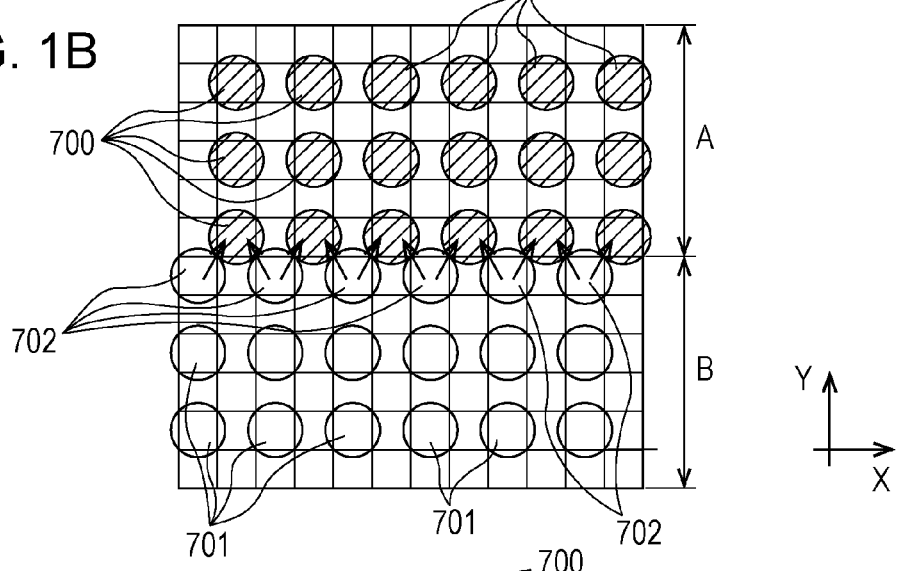
Figure 1C:
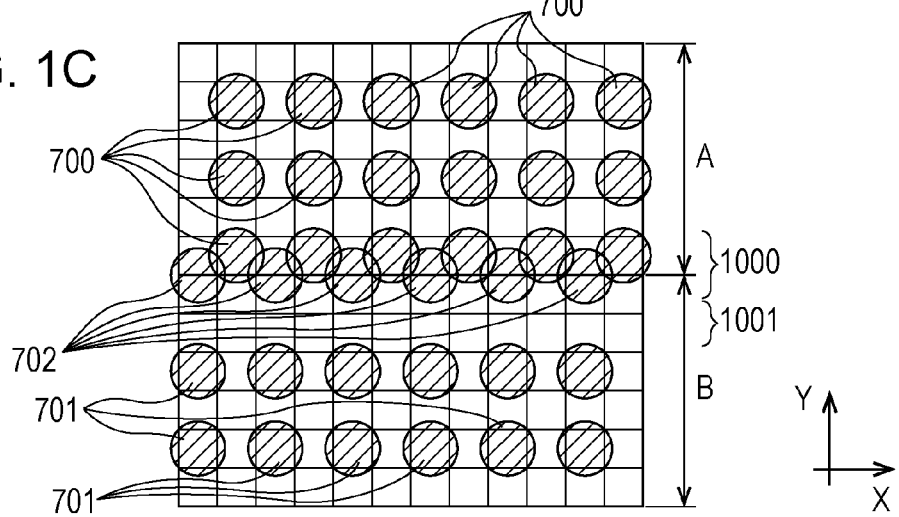
Figure 2:
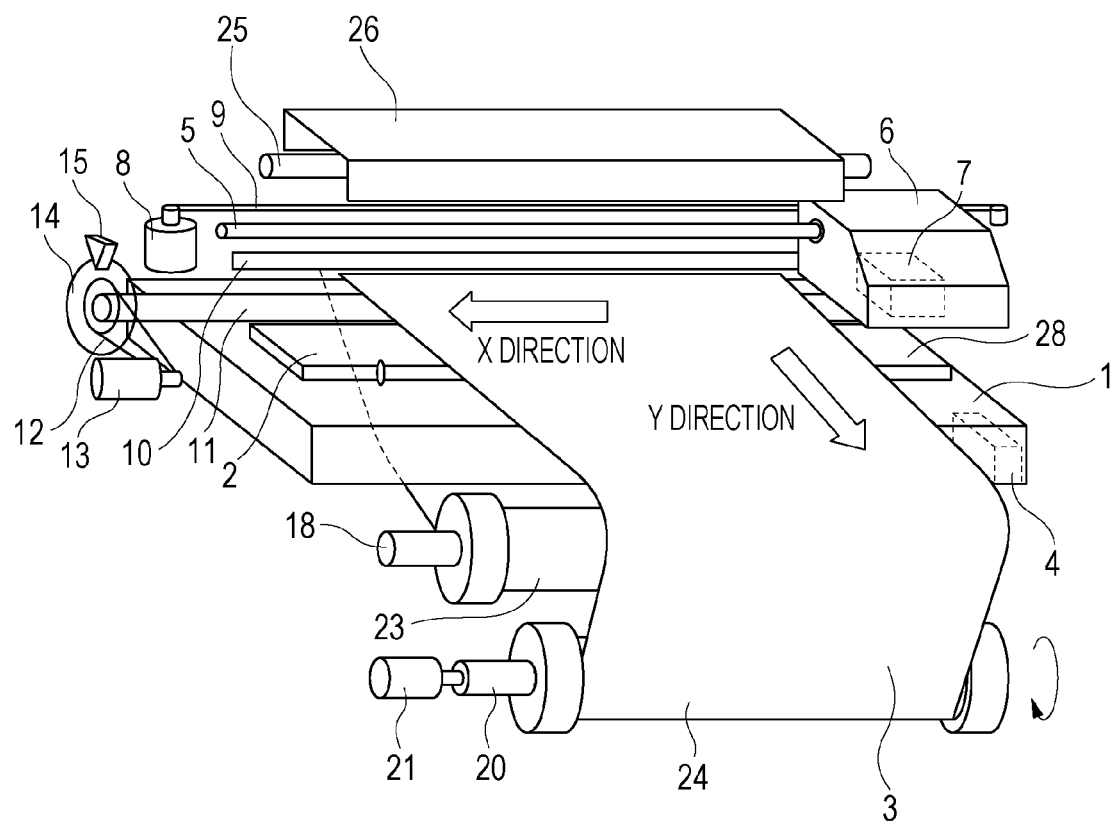
FIG. 2 is a perspective view of a recording apparatus according to an exemplary embodiment.
Figure 3:
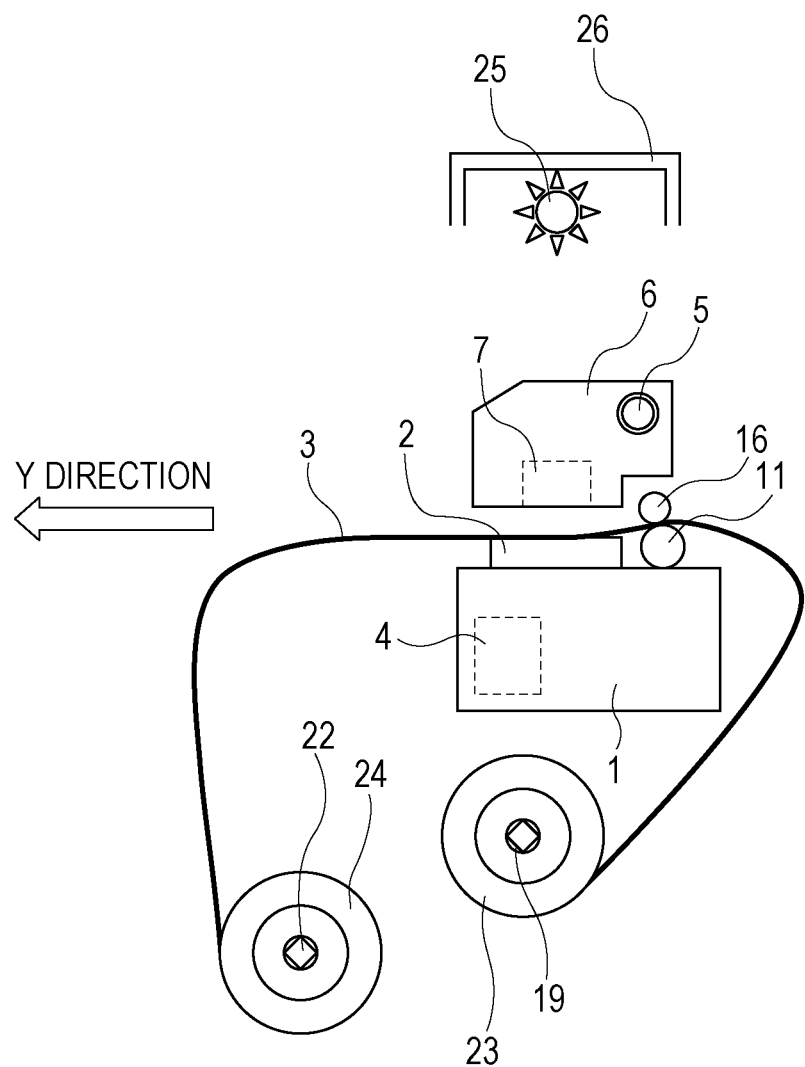
FIG. 3 is a side view illustrating an internal mechanism of the recording apparatus according to the exemplary embodiment of FIG. 2.

FIG. 2 is a perspective view illustrating a configuration of part of an image recording apparatus according to the present exemplary embodiment. FIG. 3 is a side view illustrating a configuration of part of the image recording apparatus according to the present exemplary embodiment.

A housing 1 is provided inside the image recording apparatus, and a platen 2 is disposed on the housing 1. A suction device 4 is provided inside the housing 1 for causing a sheet-like recording medium 3 to be sucked onto the platen 2. A carriage 6, which reciprocates in an X direction (scanning direction), is supported by a main rail 5 extending in the longitudinal direction of the housing 1. An ink jet type recording head 7 is provided in the carriage 6, and the recording head 7 can be of any ink jet type, such as a type that uses a heating element and a type that uses a piezoelectric element. A carriage motor 8 is a driving source for moving the carriage 6 in the X direction, and the rotational driving force of the carriage motor 8 is transmitted to the carriage 6 through a belt 9. The position of the carriage 6 along the X direction is detected and monitored with a linear encoder. The linear encoder includes a linear encoder pattern 10 mounted on the housing 1 and a reading unit (not illustrated in FIG. 2) mounted on the carriage 6, and the reading unit optically, magnetically, or mechanically reads the encoder pattern 10.

The recording medium 3 is fed from a rolled sheet feeding medium 23 provided on a sheet feeding spool 18. While a variety of media can be used as the recording medium 3, it is preferable to use a non-water absorbent or low-water absorbent medium if the recorded material is to be put on display in the open air. The recording medium 3 may, for example, have a recording surface formed of a low-water absorbent resin, such as a polyvinyl chloride sheet. The sheet feeding spool 18 is provided with a torque limiter 19 that causes braking force to act on the recording medium 3. The recording medium 3 is conveyed on the platen 2 in a Y direction (conveying direction) intersecting with the X direction of the carriage 6. The recording medium 3 is conveyed by a driving mechanism that includes a conveying roller 11, a pinching roller 16, a belt 12, and a conveying motor 13. The driving condition (amount of rotation, speed of rotation) of the conveying roller 11 is detected and monitored with a rotary encoder. The rotary encoder includes a circular encoder pattern 14 that rotates along with the conveying roller 11, and a reading unit 15 that optically, magnetically, or mechanically reads the encoder pattern 14. The recording medium 3, having been subjected to printing by the recording head 7, is taken up by a take-up spool 20 to form a rolled taken-up medium 24. The take-up spool 20 is rotated by a take-up motor 21 and includes a torque limiter 22 that causes take-up tension to act on the recording medium 3.

In the present exemplary embodiment, a coloring material in liquid ink is fixed to a medium by heat from a heater 25, which is located at a position facing the platen 2 and is supported by a frame (not illustrated).

The heater 25 is covered by a heater cover 26, and the heater cover 26 serves to irradiate the surface of the recording medium 3 efficiently with the heat from the heater 25 and also to protect the heater 25. The heater 25 is located immediately above the printing surface, and the recording medium 3 is uniformly heated when ink is ejected from the recording head 7. Thus, ink, which is an example of a liquid, ejected from the recording head 7 starts being fixed immediately after the ink lands on the printing surface by the heat from the heater 25 and the heat from the heated recording medium 3.

It should be noted that the ink does not need to be fixed completely on the recording medium 3 at the point in time when the ink receives heat from the heater 25, and it is sufficient if the ink is heated to have a certain level of viscosity so that the flowability of the ink on the recording medium 3 is reduced.

Figure 4:
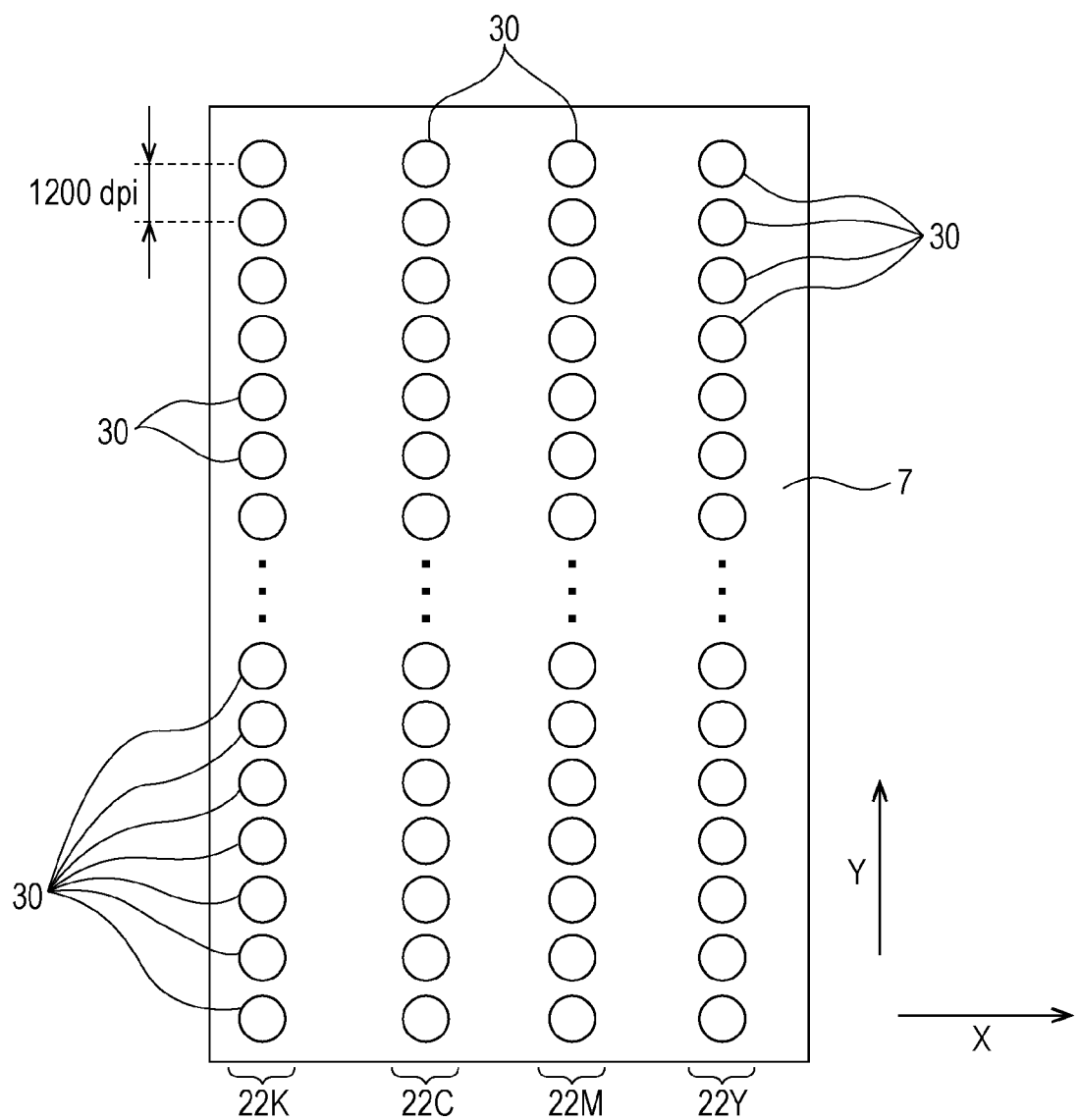
FIG. 4 is a schematic diagram of a recording head according to the exemplary embodiment of FIG. 2.

FIG. 4 is a plan view schematically illustrating arrays of nozzles 30 formed in the recording head 7 according to the present exemplary embodiment. The recording head 7 illustrated in FIG. 4 includes a plurality of nozzles 30 for ejecting ink. Each of the nozzles 30 includes an ejection orifice for ejecting ink and an ink flow channel (not illustrated in FIG. 4) that is in communication with the ejection orifice. An electrothermal converter is provided inside the ink flow channel of each of the nozzles 30, and the electrothermal converter heats the ink locally so as to induce film boiling and cause the ink to be ejected through blowing energy of the film boiling.

Nozzle rows corresponding to inks of respective colors to be used are provided in the recording head 7. In the present exemplary embodiment, each of the nozzle rows includes k nozzles 30 arrayed at a density of 1200 dpi in the Y direction, which corresponds to the conveying direction of the recording medium 3.

The recording head 7 according to the present exemplary embodiment is a so-called lateral configuration head, in which a nozzle row 22K for ejecting a black ink (K), a nozzle row 22C for ejecting a cyan ink (C), a nozzle row 22M for ejecting a magenta ink (M), and a nozzle row 22Y for ejecting a yellow ink (Y) are arranged in this order in the X direction (arrangement direction), for enabling full color image recording.

In the image recording apparatus configured as described above, the recording medium 3 is conveyed in the Y direction from a conveying unit (not illustrated in FIG. 4). The recording head 7 receives a recording signal from a recording controlling unit (not illustrated in FIG. 4), and ejects ink toward a recording area of the recording medium 3 while moving along with the carriage 6 in the X direction. Such a recording operation and a conveying operation of conveying the recording medium 3 in the Y direction by a predetermined distance are repeated.

The ink to be used in the present exemplary embodiment contains a resin emulsion. In the present exemplary embodiment, the term "resin emulsion" refers to polymer fine particles that are present in the state of being dispersed in water. Specifically, examples of the resin emulsion include an acrylic emulsion synthesized by subjecting a monomer, such as (meth)acrylic acid alkyl ester and (meth)acrylic acid alkyl amide, to emulsion polymerization; a styrene-acrylic emulsion synthesized by subjecting (meth)acrylic acid alkyl ester, (meth)acrylic acid alkyl amide, or the like and a styrene monomer to emulsion polymerization; a polyethylene emulsion; a polypropylene emulsion; a polyurethane emulsion; and a styrene-butadiene emulsion. In addition, the resin emulsion may be a core-shell type resin emulsion in which a core portion and a shell portion forming the resin emulsion have different polymer composition, or an emulsion obtained through emulsion polymerization around a seed particle served by an acrylic fine particle synthesized in advance in order to control the particle size. Furthermore, the resin emulsion may be a hybrid type resin emulsion in which different resin emulsions, such as an acrylic resin emulsion and a urethane resin emulsion, are chemically coupled.

Examples of the monomer forming the resin emulsion include a (meth)acrylic acid; (meth)acrylic acid alkyl ester synthesized from alkyl alcohol, such as methyl (meth)acrylate, n-butyl (meth)acrylate, and 2-ethylhexyl (meth)acrylate, and a (meth)acrylic acid; and (meth)acrylic acid alkyl amide, such as (meth)acrylamide, dimethyl (meth)acrylamide, N,N-dimethylethyl (meth)acrylamide, N,N-dimethylpropyl (meth)acrylamide, isopropyl (meth)acrylamide, and diethyl (meth)acrylamide (meth)acryloyl morpholine.

It is preferable that the molecular weight of the resin emulsion used in the ink of the present exemplary embodiment be such that the polystyrene equivalent number-average molecular weight (Mn) obtained through GPC is in a range from 100,000 to 3,000,000 inclusive, or more specifically in a range from 300,000 to 2,000,000 inclusive.

It is preferable that the mean particle size of the resin emulsion used in the ink of the present exemplary embodiment be in a range from 50 nm to 250 nm inclusive.

It is preferable that the glass transition temperature (Tg) of the resin emulsion used in the ink of the present exemplary embodiment be in a range from 40° C. to 90° C. inclusive. On the basis of the above, it is preferable to use a resin emulsion that uses methyl (meth)acrylate, n-butyl (meth)acrylate, or 2-ethylhexyl (meth)acrylate, in which Tg of the obtained resin emulsion falls within a range from 40° C. to 90° C. inclusive.

It is preferable that the content (mass %) of the resin emulsion used in the ink of the present exemplary embodiment be in a range from 0.1 mass % to 10.0 mass % inclusive with the total mass of the ink serving as a reference.

In the present exemplary embodiment, a sheet formed by a base material on which a polyvinyl chloride layer is formed is used as the recording medium 3. Although the recording medium 3 of the present exemplary embodiment is not limited to a polyvinyl chloride sheet, the effect of suppressing bond stripes becomes particularly notable when a recording medium that has low ink absorbing property or that does not absorb ink is used.

Figure 5:
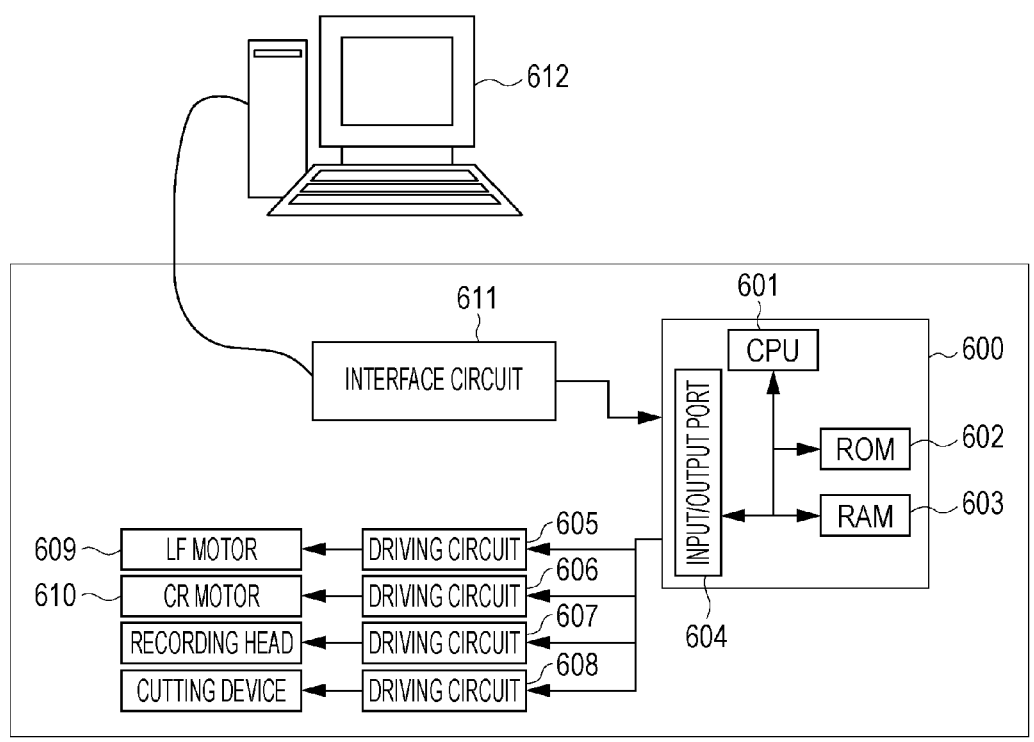
FIG. 5 is a block diagram illustrating a configuration of a recording controlling system according to the exemplary embodiment of FIG. 2.

FIG. 5 is a block diagram schematically illustrating a configuration of a controlling system according to the present exemplary embodiment. A main controlling unit 600 includes a central processing unit (CPU) 601 that carries out processing operations, such as calculation, making a selection, making a determination, and controlling; a read only memory (ROM) 602 that stores a control program or the like to be executed by the CPU 601; a random access memory (RAM) 603 that is used as a buffer or the like for recording data; and an input/output port 604. In addition, driving circuits 605, 606, 607, and 608 of actuators for a conveying motor (LF motor) 609, a carriage motor (CR motor) 610, the recording head 7, and a cutting device, respectively, are connected to the input/output port 604. Furthermore, the main controlling unit 600 is connected to a host computer 612 through an interface circuit 611.

Figure 6:
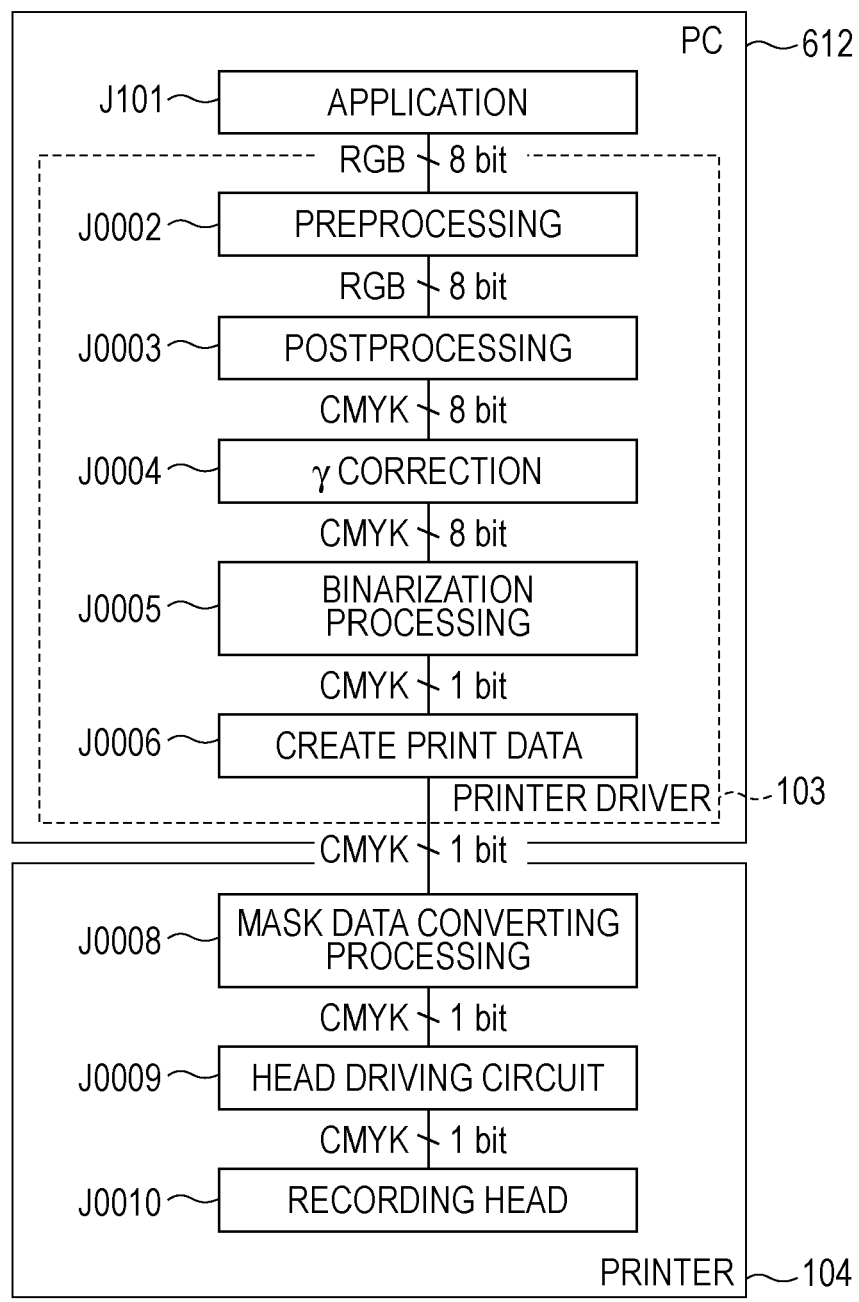
FIG. 6 is a block diagram for describing the process of data processing according to the exemplary embodiment of FIG. 2.
Figure 8A:
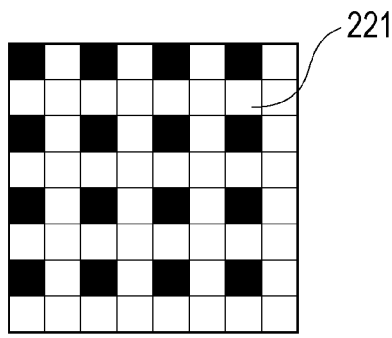
FIGS. 8A to 8D are schematic diagrams of mask patterns employed in the typical multipass recording method.
Figure 8B:
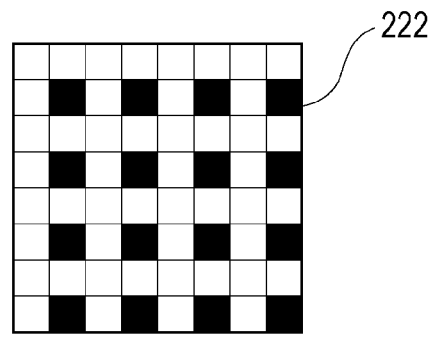
Figure 8C:
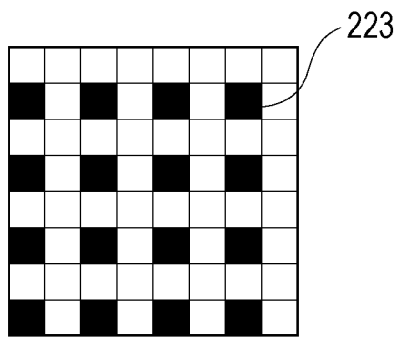
Figure 8D:
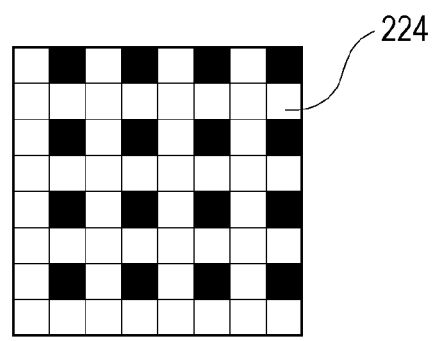

A recording operation carried out by the image recording apparatus configured as described above will now be described. FIG. 6 is a flowchart for describing the process of image data processing. A user can create data on an image to be recorded by a printer 104 through an application J101 of the host computer 612. When the image is recorded, the image data created with the application J101 is transmitted to a printer driver 103. The printer driver 103 carries out preprocessing J0002, postprocessing J0003, γ correction J0004, binarization processing J0005, and print data creation J0006 on the created image data. In the preprocessing J0002, color gamut conversion is carried out to convert the color gamut of a display device of the host computer 612 to the color gamut of the printer 104. With the use of a three-dimensional lookup table, image data R, G, B in which R, G, and B are each expressed in eight bits is converted to 8-bit data R, G, B of the color gamut of the printer 104. In the postprocessing J0003, colors for reproducing the converted color gamut are separated into the color gamut of the inks. Processing is carried out for obtaining 8-bit data C, M, Y, K corresponding to a combination of inks for reproducing the colors expressed by the 8-bit data R, G, B of the color gamut of the printer 104, which has been obtained through the preprocessing J0002. In the γ correction J0004, γ correction is carried out on each piece of the 8-bit data C, M, Y, K obtained through the color separation. The conversion is carried out in such a manner that each piece of the 8-bit data C, M, Y, K obtained through the postprocessing J0003 is linearly associated with the gradation characteristics of the printer 104. In the binarization processing J0005, quantization processing is carried out to convert each piece of the 8-bit data C, M, Y, K obtained through the γ correction J0004 to 1-bit data C, M, Y, K. A density pattern method, a dither method, an error diffusion method, or the like can be suitably used as the quantization method. In the print data creation processing J0006, 1-bit print data is created by appending print controlling data or the like to image data containing the 1-bit data C, M, Y, K obtained through the binarization processing J0005. It should be noted that the print controlling data includes information on the recording medium 3, information on the recording quality, and so forth.

The print data created as described above is supplied to the printer 104. In mask data converting processing J0008, the print data is converted to recording data by using the print data created in the print data creation processing J0006 and data on a mask pattern, which will be described later. The recording data indicates whether or not each dot is to be formed, or in other words, indicates recording and non-recording patterns with the inks by the recording head 7. The mask pattern is formed by recording permitted pixels and recording non-permitted pixels arranged in a specific pattern therein. In the recording permitted pixels, the print data is converted to data indicating that ejection of ink is permitted, and in the recording non-permitted pixels, the print data is converted to data indicating that ejection of ink is not permitted. It should be noted that the mask pattern used in the mask data converting processing J0008 is stored in advance in a predetermined memory of the printer 104. For example, the mask pattern may be stored in the aforementioned ROM 602, and the CPU 601 can convert the print data to the recording data by using the stored mask pattern.

The recording data obtained through the mask data converting processing J0008 is supplied to the head driving circuit 607 and the recording head 7. On the basis of the recording data, the ink is ejected onto the recording medium 3 through the nozzles 30 arrayed in the recording head 7.

On the basis of ejection data created through the processing as described above, driving of each motor and the recording head 7 is controlled through the input/output port 604, and the recoding operation is carried out. The recording technique according to the present exemplary embodiment is implemented by using the method for generating the recording data as described above.

FIG. 7 illustrates a diagram for describing a multipass recording method used to carry out recording in a unit area on a recording medium through four instances of the recording scan. FIGS. 8A to 8D illustrate diagrams for describing mask patterns employed in the respective instances of the recording scan in the multipass recording method.

The nozzles 30 provided in a nozzle row 22 for ejecting ink are divided into four recording groups 201, 202, 203, and 204 along the Y direction.

Mask patterns 221, 222, 223, and 224 are each formed by a plurality of recording permitted pixels and a plurality of recording non-permitted pixels arranged therein. In FIGS. 8A to 8D, solid black portions correspond to the recording permitted pixels, and solid white portions correspond to the recording non-permitted pixels. In the recording permitted pixels, if the inputted image data indicates that ink is to be ejected, the image data is converted to recording data indicating that the ink is actually to be ejected. Meanwhile, in the recording non-permitted pixels, even if image data that indicates that the ink is to be ejected is inputted, the image data is converted to recording data indicating that the ink is not to be ejected.

It should be noted that the recording permitted pixels are located at different and complementary positions among the mask patterns 221, 222, 223, and 224.

Hereinafter, an example in which a solid image is formed on the recording medium 3 will be described.

In the first instance of the recording scan, ink is ejected from the recording group 201 onto an area 211 of the recording medium 3 in accordance with the dot arrangement pattern 221. As a result, ink is ejected onto the recording medium 3 at positions indicated in section A of FIG. 7.

Subsequently, the recording medium 3 is conveyed in the Y direction from the upstream side to the downstream side by a distance of L/4 relative to the recording head 7.

Thereafter, the second instance of the recording scan is carried out. In the second instance of the recording scan, ink is ejected onto the area 211 of the recording medium 3 from the recording group 202 in accordance with the mask pattern 222, and ink is ejected onto an area 212 from the recording group 201 in accordance with the mask pattern 221. As a result of this second instance of the recording scan, an image illustrated in section B of FIG. 7 is formed on the recording medium 3.

Thereafter, the recording scan with the recording head 7 and the conveyance of the recording medium 3 relative to the recording head 7 are repeated. As a result, ejection of ink onto a small area corresponding to the entire pixels in the area 211 of the recording medium 3 is completed as in section D after the fourth instance of the recording scan, and the solid image is thus formed.

It should be noted that an area corresponding to a pixel on the recording medium 3 may simply be referred to as a "pixel" in the following description.

Hereinafter, the mask patterns according to the present exemplary embodiment will be described in detail.

Figure 9:
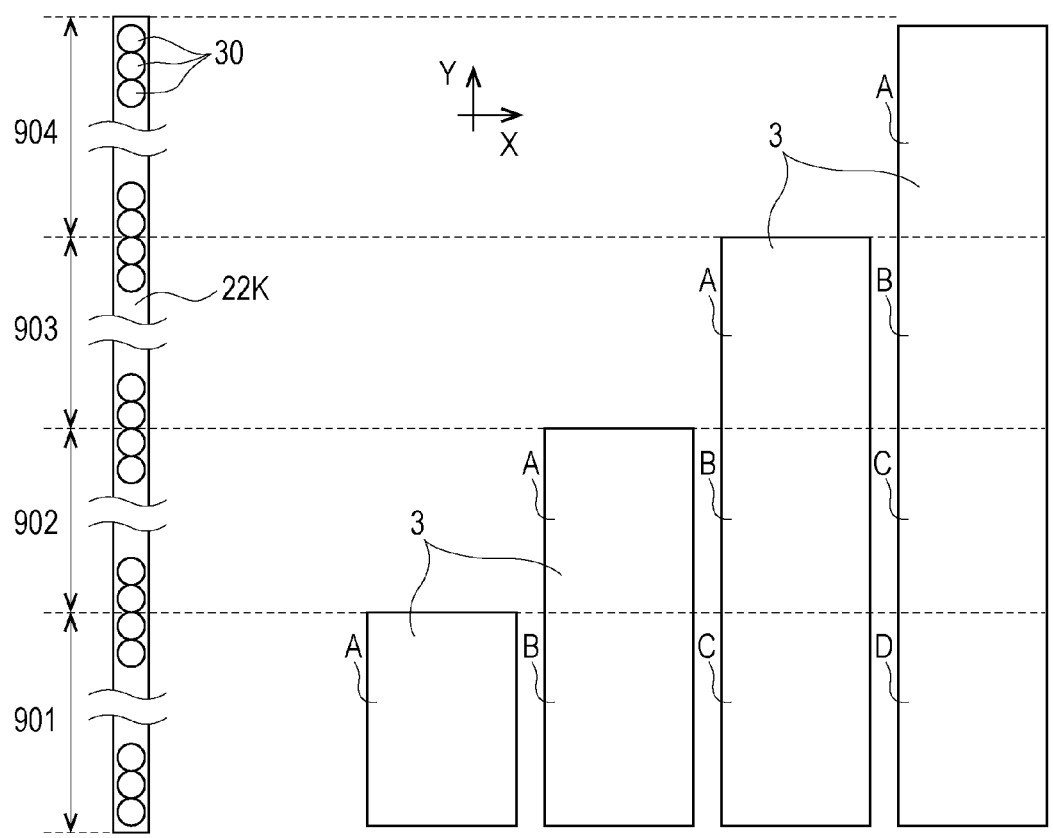
FIG. 9 is a diagram for describing a multipass recording method according to the present exemplary embodiment of FIG. 2.

FIG. 9 is a diagram for describing the multipass recording method according to the present exemplary embodiment.

In the first exemplary embodiment, an example in which k=160 will be described. In addition, for the sake of simplicity, the nozzle row 22K of the recording head 7 for ejecting a black ink will be described.

The 160 nozzles 30 arrayed in the nozzle row 22K for ejecting the black ink are divided into four nozzle groups, namely, a first recording group 901, a second recording group 902, a third recording group 903, and a fourth recording group 904, each including 40 nozzles 30.

As the recording head 7 is moved in the X direction while an area A of the recording medium 3 is at a position corresponding to the first recording group 901, the first instance of the recording scan is carried out on the area A of the recording medium 3. Thereafter, the recording medium 3 is conveyed in the Y direction until the area A is at a position corresponding to the second recording group 902. After this conveyance, the recording scan in the X direction by the recording head 7 is carried out. This recording scan corresponds to the second instance of the recording scan on the area A of the recording medium 3, and corresponds to the first instance of the recording scan on an area B. Thereafter, the recording scan and the conveyance are repeated in a similar manner, and an image is completed in the area A after the fourth instance of the recording scan by the fourth recording group 904.

FIGS. 10A to 10D illustrate examples of the mask patterns employed in the present exemplary embodiment.

Mask patterns 801, 802, 803, and 804 illustrated respectively in FIGS. 10A, 10B, 10C, and 10D are employed in the first, second, third, and fourth recording groups 901, 902, 903, and 904, respectively.

In the mask patterns 801, 802, 803, and 804, solid black portions correspond to the recording permitted pixels, and solid white portions correspond to the recording non-permitted pixels. The recording permitted pixels in the respective recording groups 901, 902, 903, and 904 are arranged in a complementary relationship so that the entire pixels are recorded through four instances of the recording scan.

It should be noted that while the number of the recording permitted pixels in each of the mask patterns 801, 802, 803, and 804 is identical, the present invention is not limited to this example. For example, in each of the mask patterns 801 and 802, 30% of the entire pixels may be designated as the recording permitted pixels, and in each of the mask patterns 803 and 804, 20% of the entire pixels may be designated as the recording permitted pixels.

Figure 10A:
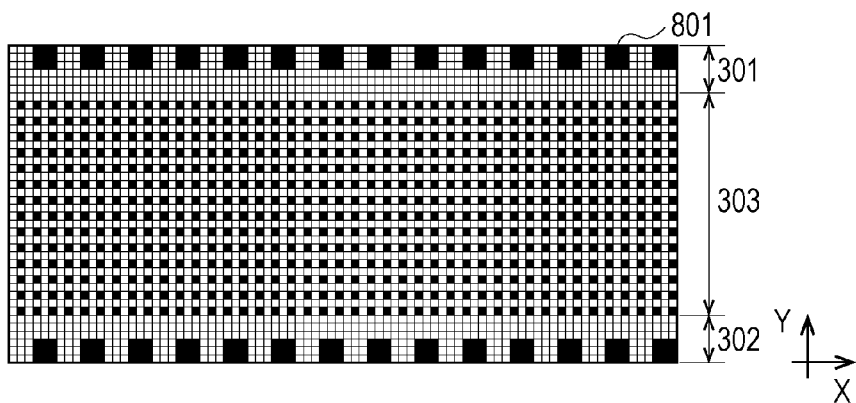
FIGS. 10A to 10D are schematic diagrams of the mask patterns according to the exemplary embodiment of FIG. 2.
Figure 10B:
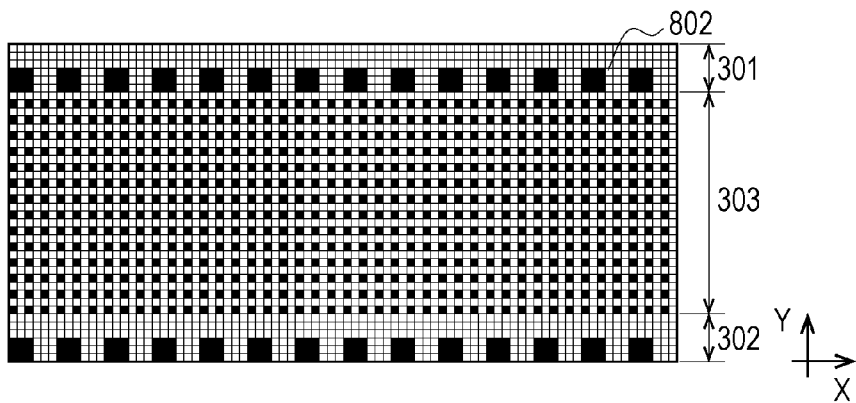
Figure 10C:
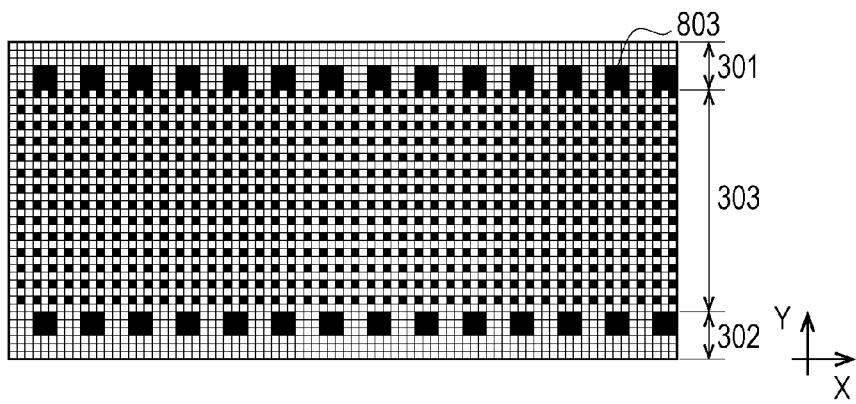
Figure 10D:
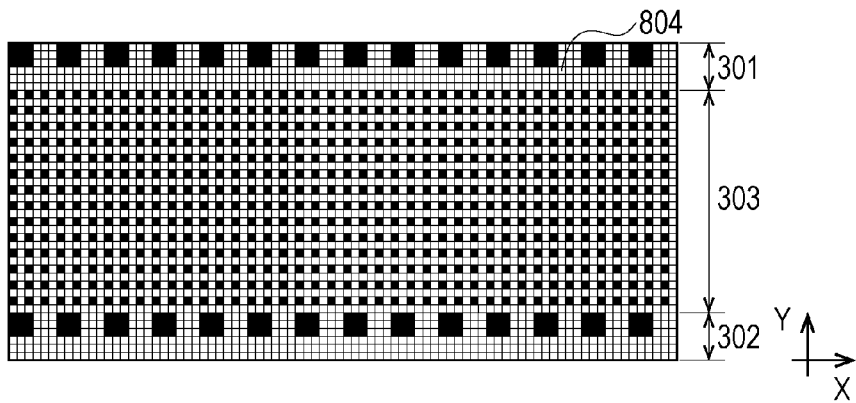

FIG. 10A illustrates the mask pattern 801 that is employed in the first recording group 901 corresponding to the first instance of the recording scan. The mask pattern 801 is divided into three areas along the Y direction, namely, an area 301 formed by six pixels corresponding to six nozzles 30 at the downstream side end of the first recording group 901, an area 302 formed by six pixels corresponding to six nozzles 30 at the upstream side end, and an area 303 corresponding to the rest of the nozzles 30. The areas 301 and 302 each correspond to the aforementioned boundary portion between the recording scans. The recording permitted pixels are arranged such that the average of the numbers of the recording permitted pixels in recording permitted pixel units in each of the areas 301 and 302 differs from that in the area 303. It should be noted that the recording permitted pixel unit is formed by a recording permitted pixel group that is formed by a plurality of recording permitted pixels disposed adjacent to one another or a single recording permitted pixel that is not adjacent to any other recording permitted pixel, and will be described later in detail.

Similarly to the mask pattern 801, each of the mask patterns 802, 803, and 804 is divided along the Y direction into an area 301 corresponding to the downstream side end, an area 302 corresponding to the upstream side end, and an area 303 corresponding to the rest of the pixels. It should be noted that the recording permitted pixels are arranged at different and complementary positions among the mask patterns 801, 802, 803, and 804.

It should be noted that the recording permitted pixels are arranged such that the ratio of the number of the recording permitted pixels to the number of the recording non-permitted pixels is identical in each of the areas 301, 302, and 303.

FIGS. 11A to 11D are diagrams for describing the definition of the recording permitted pixel unit and the average of the numbers of the recording permitted pixels in the recording permitted pixel units according to the present exemplary embodiment.

Figure 11A:
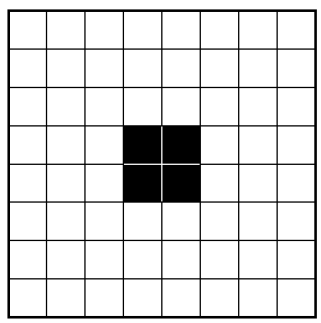
FIGS. 11A to 11D are diagrams for describing a recording permitted pixel unit according to the exemplary embodiment of FIG. 2.

As described above, the recording permitted pixel group is formed by a plurality of mutually adjacent recording permitted pixels. For example, FIG. 11A illustrates a square-shaped recording permitted pixel group formed by four pixels arranged in two pixels by two pixels. In this case, the number of the recording permitted pixels in the recording permitted pixel unit is four.

Figure 11B:
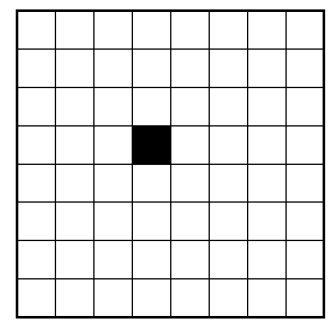

A recording permitted pixel that is not adjacent to any other recording permitted pixel also forms a recording permitted pixel unit in the present exemplary embodiment. FIG. 11B illustrates a recording permitted pixel that is not adjacent to any other recording permitted pixel. In this case, the number of the recording permitted pixels in the recording permitted pixel unit is one.

Figure 11C:
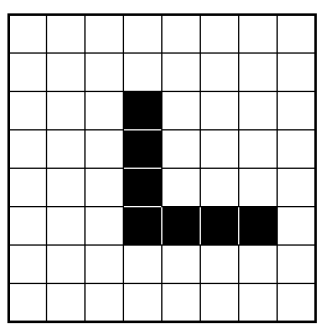

A plurality of recording permitted pixels that extend unevenly in a specific direction also form a recording permitted pixel group in the present exemplary embodiment, and the recording permitted pixel group is not limited to the one having an isotropic shape as illustrated in FIG. 11A. FIG. 11C illustrates an L-shaped recording permitted pixel group in which the recording permitted pixels extend unevenly in a specific direction. In this case, the number of the recording permitted pixels in the recording permitted pixel unit is seven.

Figure 11D:
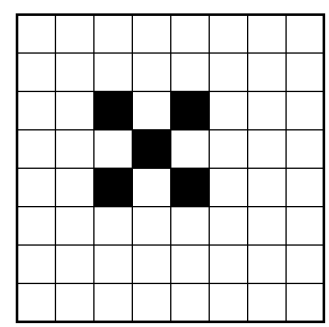

In addition, the mutually adjacent recording permitted pixels include not only the recording permitted pixels that are adjacent in the X or Y direction but also the recording permitted pixels that are adjacent in a diagonal direction. In other words, a single recording permitted pixel may have a total of eight adjacent recording permitted pixels, namely, two in the X direction, two in the Y direction, and four in the diagonal directions. FIG. 11D illustrates a recording permitted pixel group in which the recording permitted pixels are adjacent in the diagonal directions. In this case, the number of the recording permitted pixels in the recording permitted pixel unit is five.

Now, a method for calculating the average of the numbers of the recording permitted pixels in the recording permitted pixel units and the distance between the recording permitted pixel units will be described with reference to FIGS. 10, 12A and 12B.

In the present exemplary embodiment, the number of the recording permitted pixel units included in an area of a mask pattern (hereinafter, referred to as an evaluation area), which is formed by 72 pixels arranged in a matrix of 12 pixels in the X direction by six pixels in the Y direction, is calculated, and the number of the recording permitted pixels in each of the recording permitted pixel units in the evaluation area is then calculated. Furthermore, the sum of the numbers of the recording permitted pixels in the recording permitted pixel units is calculated, and the calculated sum is divided by the number of the recording permitted pixel units so as to obtain the average of the numbers of the recording permitted pixels in the recording permitted pixel units in each area of the mask pattern.

Figure 12A:
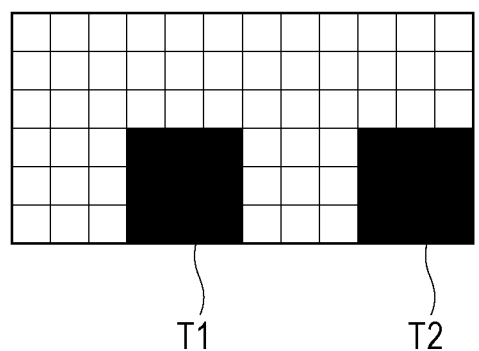
FIGS. 12A and 12B are diagrams for describing an evaluation area of a mask pattern according to the exemplary embodiment of FIG. 2.
Figure 12B:
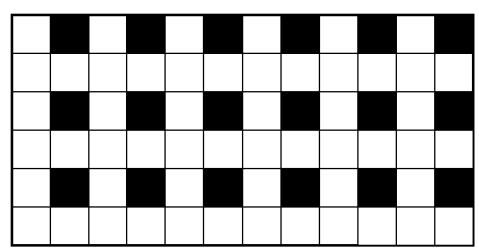

FIGS. 12A and 12B are diagrams for describing the average of the numbers of the recording permitted pixels in areas of the mask pattern according to the present exemplary embodiment.

FIG. 12A illustrates an evaluation area in the area 301 of the mask pattern 801 corresponding to the downstream side end of the first recording group 901 in the present exemplary embodiment. FIG. 12B illustrates an evaluation area in the area 303 of the mask pattern 801 corresponding to an area excluding the upstream side end and the downstream side end of the first recording group 901 in the present exemplary embodiment.

For example, recording permitted pixel units T1 and T2 are each formed by nine mutually adjacent recording permitted pixels in the evaluation area in the area 301 of the mask pattern 801 of the first recording group 901 in the present exemplary embodiment. Thus, the average of the numbers of the recording permitted pixels in the recording permitted pixel units in the area 301 of the mask pattern 801 is obtained by dividing 18, which is the sum of the numbers of the recording permitted pixels in the recording permitted pixel units, by two, which is the number of the recording permitted pixel units, and the value of nine is thus obtained.

Meanwhile, there are no mutually adjacent recording permitted pixels in the evaluation area in the area 303 of the mask pattern 801 of the first recording group 901. In other words, on the basis of the above definition, there are total of 18 recording permitted pixel units in each of which the number of the recording permitted pixels in the recording permitted pixel unit is one. Thus, the average of the numbers of the recording permitted pixels in the recording permitted pixel units in the area 303 of the mask pattern 801 is obtained by dividing 18, which is the sum of the numbers of the recording permitted pixels in the recording permitted pixel units, by 18, which is the number of the recording permitted pixel units, and the value of one is thus obtained.

As illustrated in FIGS. 10A to 10D and FIGS. 12A and 12B, in the present exemplary embodiment, occurrence of bond stripes is suppressed by applying a mask pattern having a greater average of the numbers of the recording permitted pixels in the recording permitted pixel units to the nozzles corresponding to the boundary portion between the recording scans, as compared to a mask pattern applied to the nozzles in areas aside from the boundary portion.

Hereinafter, the mechanism for suppressing the occurrence of bond stripes will be described in detail.

Figure 13A:
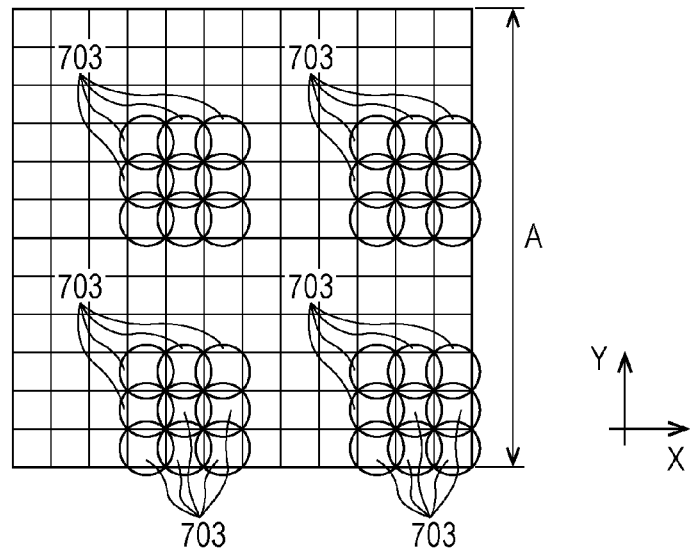
FIGS. 13A to 13C are diagrams for describing a mechanism of suppressing bond stripes according to the exemplary embodiment of FIG. 2.
Figure 13B:
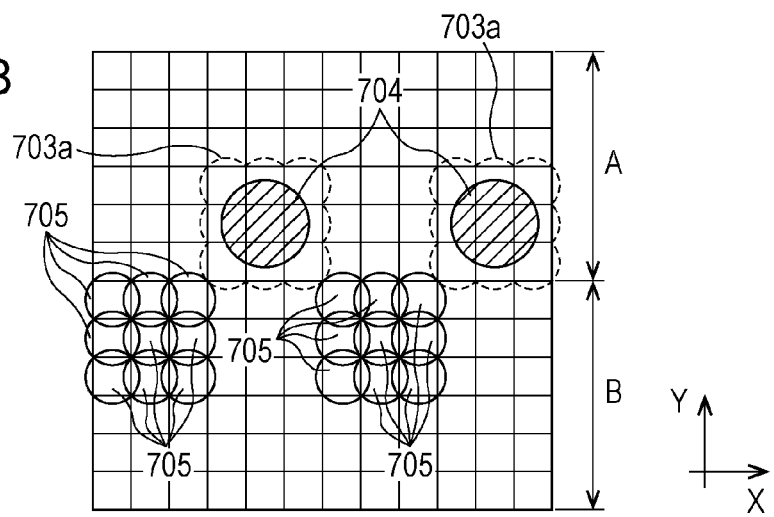
Figure 13C:
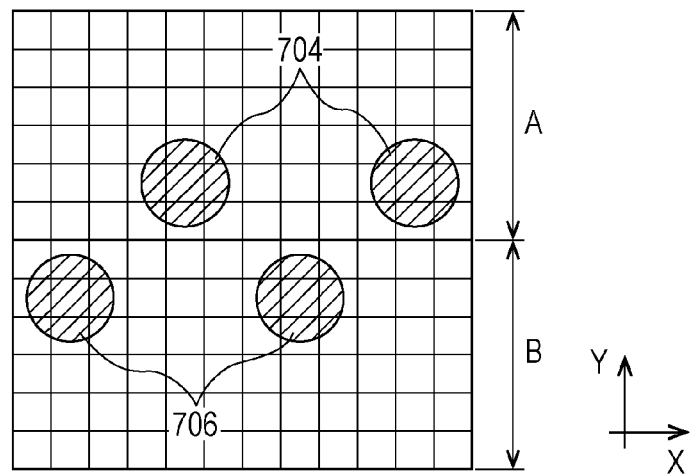

FIGS. 13A to 13C are diagrams for describing the process of forming an image in an area on the recording medium which corresponds to a boundary portion between the recording scans, when the recording is carried out through the recording method according to the present exemplary embodiment.

FIG. 13A is a schematic diagram of an image surface obtained when the first instance of the recording scan is carried out to eject ink onto an area A of the recording medium 3 which corresponds to the boundary portion between the recording scans. It should be noted that the area A corresponds to an area on the recording medium 3 on which the recording is carried out with the six nozzles 30 disposed at the upstream side end of the first recording group 901 in the Y direction. Thus, the area 302 of the mask pattern 801 illustrated in FIG. 10A is employed for the recording. Thus, nine ink droplets 703 are ejected at positions that are in contact with one another as illustrated in FIG. 13A.

FIG. 13B is a schematic diagram of an image surface obtained when the second instance of the recording scan is carried out on the area A and the first instance of the recording scan is carried out on an area B that is adjacent to the area A at the upstream side thereof in the Y direction after the recording illustrated in FIG. 13A has been carried out and the recording medium 3 has been conveyed. It should be noted that, for the sake of simplicity, ink ejected onto the area A in the second instance of the recording scan is not illustrated. In addition, the area B corresponds to an area on the recording medium 3 on which the recording is carried out with the six nozzles 30 disposed at the downstream side end of the first recording group 901 in the Y direction, and the area 301 of the mask pattern 801 illustrated in FIG. 10A is employed.

The ink droplets 703 ejected through the recording scan illustrated in FIG. 13A have been ejected at positions that are in contact with one another, and thus force that pulls the ink droplets 703 together acts thereon. Thus, the nine ink droplets 703 form a single large dot 704 and are then fixed on the surface of the recording medium 3. Here, when being fixed, the nine ink droplets 703 flow so as to be attracted to one another. Thus, in a case in which the ink droplets 703 ejected through the first instance of the recording scan form the large dot 704, the large dot 704 occupies an area that is smaller than an area 703a on the surface of the recording medium 3.

Thus, as illustrated in FIG. 13B, even in a case in which ink is ejected through the second instance of the recording scan onto positions that are in the proximity of the positions onto which the ink has been ejected through the first instance of the recording scan, the large dot 704 formed through the first instance of the recording scan does not make contact, on the recording medium 3, with ink droplets 705 ejected through the second instance of the recording scan, and thus beading does not occur.

FIG. 13C illustrates an image surface obtained when the ink droplets 705 ejected onto the area B have been fixed after the recording illustrated in FIG. 13B has been carried out. The ink droplets 705 are ejected such that the nine ink droplets 705 are in contact with one another, and the ink droplets 705 thus form a large dot 706, which is then fixed. At this point, the ink droplets 705 do not make contact with the large dot 704 and are thus fixed without moving unevenly in a specific direction. Thus, it is considered that bond stripes can be effectively suppressed.

It is considered that the mechanism that makes it possible to suppress bond stripes in the present exemplary embodiment is not limited to the mechanism described above. For example, even in a case in which the ink droplets flow to a lesser extent in directions in which the ink droplets are attracted to one another when forming a large dot and ink droplets are ejected through a subsequent instance of the recording scan onto positions that make contact with the large dot, it is considered that the present exemplary embodiment can suppress bond stripes effectively. Even in a case in which the large dot makes contact with the ink droplets, the ink droplets are ejected in a plurality onto the positions that are in contact with one another, and thus the ink droplets form a single large ink droplet (hereinafter, referred to as a large ink droplet) prior to being fixed. This large ink droplet has larger mass than a single ink droplet, and is thus less likely to be pulled toward another large dot upon making contact with the other large dot. Therefore, the influence of beading is reduced, and bond stripes thus become less noticeable.

Figure 14:
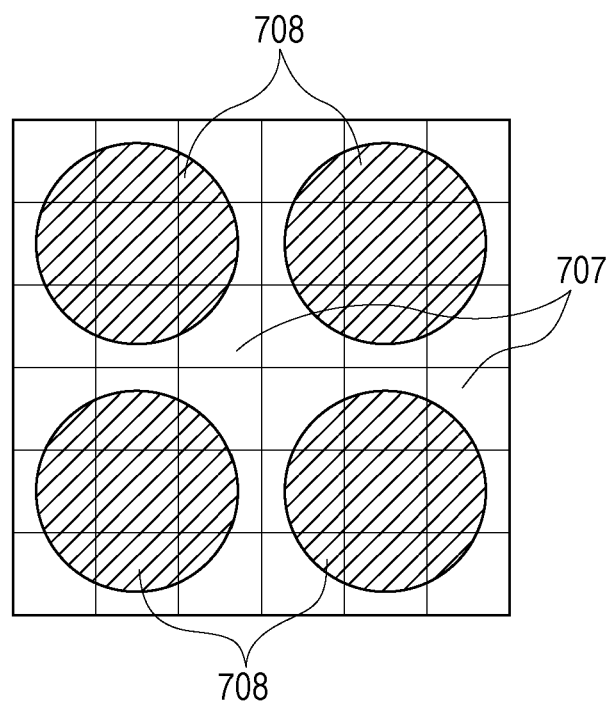
FIG. 14 illustrates an image surface obtained when a solid image is formed while varying the number of recording permitted pixels in a recording permitted pixel unit.

FIG. 14 illustrates an image surface obtained when recording is carried out using a mask pattern of which the average of the numbers of the recording permitted pixels in the recording permitted pixel units is nine in each instance of the recording scan. FIG. 14 illustrates an image formed when ink is ejected onto the entire pixels (hereinafter, referred to as a solid image).

In a case in which the number of the recording permitted pixels in a recording permitted pixel unit is relatively large, a plurality of ink droplets are ejected at positions that are adjacent to one another in a single instance of the recording scan, as illustrated in FIG. 14, and thus a large dot 708 is formed. When forming this large dot 708, the ink droplets flow in directions in which the ink droplets are attracted to one another, as described above, and thus an obtained solid image has a noticeable granular appearance. In addition, in a case in which the recording is carried out by forming the large dots 708, the coverage of the surface of the recording medium 3 is reduced, and an area 707 in which the surface of the recording medium 3 is exposed is generated. Thus, the uniformity in the solid image is also lost.

Due to the stated reasons, in the present exemplary embodiment, of the mask patterns corresponding to the respective instances of the recording, in a mask pattern for an area corresponding to the boundary portion between the recording scans, the recording permitted pixels are arranged such that the average of the numbers of the recording permitted pixels in the recording permitted pixel units is relatively high, in order to suppress bond stripes. In addition, in a mask pattern for an area corresponding to an area other than the boundary portion between the recording scans, the recording permitted pixels are disposed such that the average of the numbers of the recording permitted pixels in the recording permitted pixel units is relatively small, in order to suppress the granular appearance and a reduction in the uniformity.

According to the configuration described above, even in a case in which such ink that the critical surface tension of the surface of an ink layer formed on the recording medium 3 differs from the critical surface tension of the recording medium 3 is used, bond stripes can be suppressed effectively.

Second Exemplary Embodiment

In the first exemplary embodiment, an example in which the number of the recording permitted pixels in a recording permitted pixel unit in an area of a mask pattern corresponding to the boundary portion between the recording scans is relatively large in all of the plurality of mask patterns corresponding to the respective instances of the recording scans for recording in a unit area has been described.

In the meantime, in the present exemplary embodiment, an example in which the number of the recording permitted pixels in a recording permitted pixel unit in an area corresponding to the boundary portion between the recording scans is relatively large in a predetermined number of mask patterns among the plurality of mask patterns will be described.

It should be noted that descriptions of configurations that are identical to those of the first exemplary embodiment described above will be omitted.

FIGS. 15A to 15D illustrate examples of the mask patterns employed in the present exemplary embodiment.

In the present exemplary embodiment, the recording permitted pixels are disposed such that the number of the recording permitted pixels in a recording permitted pixel unit in an area corresponding to the boundary portion between the recording scans is relatively large in mask patterns corresponding to the first and second instances of the recording scan, among four instances of the recording scan, on a unit area of the recording medium 3.

FIGS. 15A, 15B, 15C, and 15D illustrate mask patterns corresponding to the first, second, third, and fourth instances of the recording scan, respectively. It should be noted that the recording permitted pixels in the mask patterns are disposed at mutually exclusive positions.

Figure 15A:
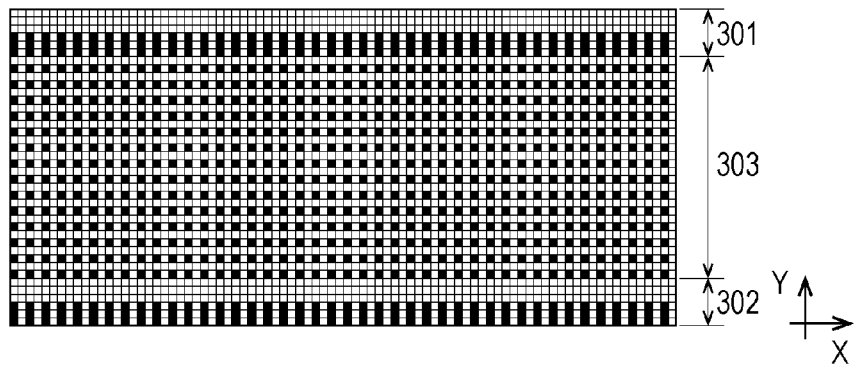
FIGS. 15A to 15D are schematic diagrams of mask patterns according to an exemplary embodiment.
Figure 15B:
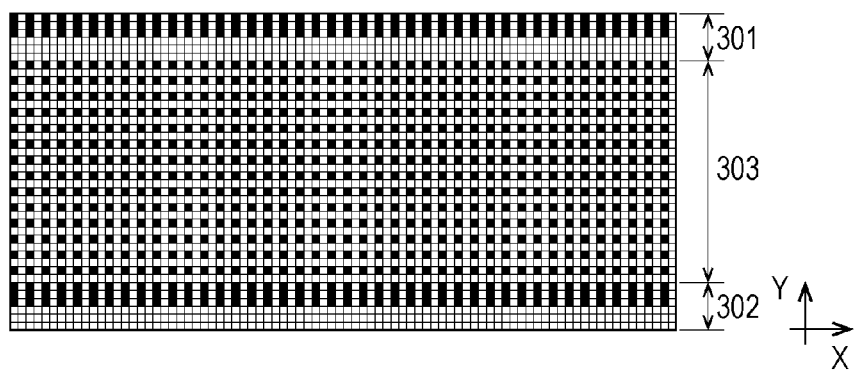

As can be seen from FIGS. 15A and 15B, the recording permitted pixels are disposed such that the average of the numbers of the recording permitted pixels in the recording permitted pixel units is three in the area 301 at the upstream side end in the Y direction and in the area 302 at the downstream side end in the mask patterns corresponding to the first and second instances of the recording scan. In addition, the recording permitted pixels are disposed such that the average of the numbers of the recording permitted pixels in the recording permitted pixel units is one in the area 303 other than the areas at the upstream side end and the downstream side end.

Figure 15C:
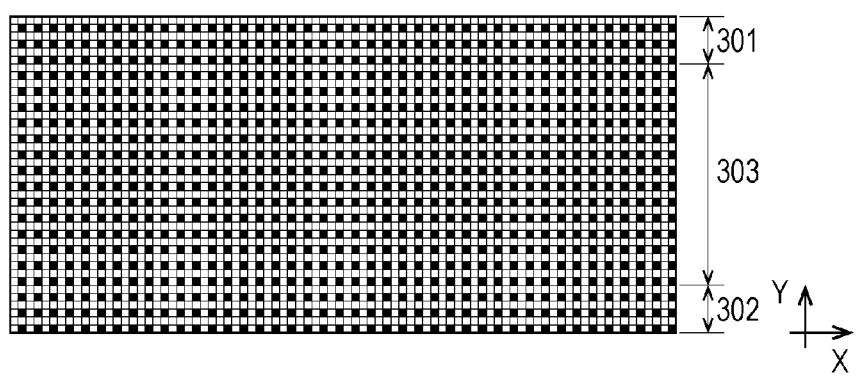
Figure 15D:
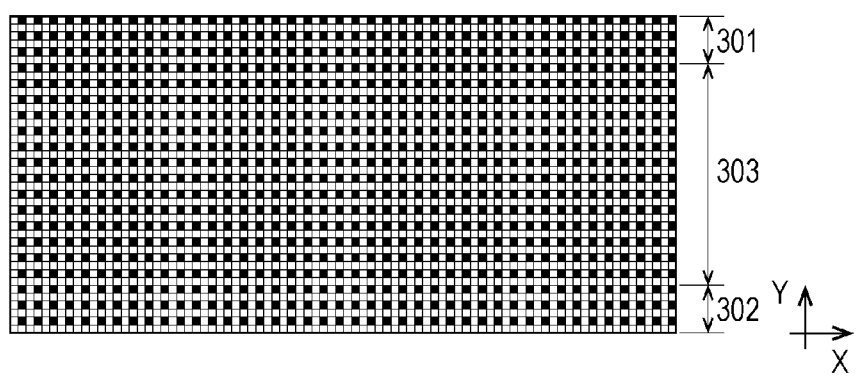

Meanwhile, as illustrated in FIGS. 15C and 15D, the recording permitted pixels are disposed such that the average of the numbers of the recording permitted pixels in the recording permitted pixel units is one in each of the areas 301, 302, and 303 in the mask patterns corresponding to the third and fourth instances of the recording scan.

In a case in which the ink has high wettability to the recording medium 3, the ink covers substantially the entire surface of the recording medium 3 at the time of a recording scan prior to the final recording scan in the multipass recording. In such a case, the coverage of the ink in an area recorded through a preceding instance of the recording scan does not differ greatly from the coverage of the ink in an area recorded in the following instance of the recording scan in the boundary portion between later instances of the recording scan, and thus a difference in the critical surface tension is substantially not generated. Thus, it is considered that bond stripes are less likely to occur between the later instances of the recording scan.

In the present exemplary embodiment, the area corresponding to the boundary portion between the recording scans is recorded with the large dots in the first and second instances of the recording scan, and thus the occurrence of the bond stripes can be suppressed effectively. In addition, when the third instance of the recording scan is carried out, the surface of the recording medium 3 is substantially covered by the ink layers formed through the first and second instances of the recording scan, and thus bond stripes are less likely to appear. Therefore, by ejecting the ink onto such positions that the ink droplets do not make contact with one another in an area corresponding to the boundary portion between the recording scans in the third and fourth instances of the recording scan, the granular appearance and the reduction in the uniformity in the image can be suppressed.

As described above, according to the image recording apparatus described in the present invention, bond stripe can be made less noticeable, and a higher quality image can be obtained.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In addition, the recording apparatus that uses a so-called thermosetting type ink that contains a resin emulsion and that forms a film on the surface of the recording medium by being heated after the ink droplets land on the recording medium and is then fixed has been described in each of the exemplary embodiments. The present invention, however, is not limited to such a recording apparatus that uses the thermosetting type ink, and may be applied to an image recording apparatus that uses such ink that the critical surface tension at the surface of the ink layer formed on the recording medium differs from the critical surface tension of the recording medium.

In addition, a so-called thermal jet type ink jet recording apparatus and a thermal jet type recording method in which ink is ejected through blowing energy generated by heating have been described in each of the exemplary embodiments. The present invention, however, is not limited to the thermal jet type ink jet recording apparatus. For example, the present invention can be effectively applied to various types of image recording apparatuses, such as a so-called piezoelectric type ink jet recording apparatus in which ink is ejected by using a piezoelectric element.

In addition, although the image recording apparatus that uses a sheet having a polyvinyl chloride layer formed thereon as the recording medium has been described in each of the exemplary embodiments, the present invention is applicable to an image recording apparatus that uses a recording medium having low water-absorbency to a certain extent.

In addition, an example in which ejection of ink in each instance of the recording scan is controlled by using a mask pattern corresponding to an area on the recording medium over which the recording head passes in each instance of the recording scan has been described in each of the exemplary embodiments. Alternatively, ejection of ink in each instance of the recording scan may be controlled by repeatedly using a mask pattern that is divided into a smaller piece.

In addition, an example in which the number of the recording permitted pixels in a recording permitted pixel unit at one end of a predetermined mask pattern and at the other end that is opposite to the one end is made relatively large has been described in each of the exemplary embodiments. Alternatively, the present invention may be applied to an example in which the number of the recording permitted pixels in a recording permitted pixel unit only in one of the one end and the other end is made relatively large.

In addition, a mask pattern defined by the average of the numbers of the recording permitted pixels in the recording permitted pixel units has been described in each of the exemplary embodiments. The present invention, however, is not limited to such an example. For example, the present invention can be suitably applied to a mask pattern in which the dispersivity of the recording permitted pixels is small at the ends and the dispersivity of the recording permitted pixels is large at a center portion.

In addition, although the image recording method that uses the image recording apparatus has been described in each of the exemplary embodiments, the present invention can be applied to a mode in which a data generation apparatus that generates data for implementing the image recording method of the exemplary embodiments, a data generating method, and a program are prepared separately from the recording apparatus. In addition, it is needless to say that the present invention can be widely applied to a mode in which the above entities are provided as part of the recording apparatus.

According to the image recording apparatus of an example of the present invention, bond stripes can be effectively suppressed, and a higher quality image can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-145803, filed Jul. 11, 2013, which is hereby incorporated by reference herein in its entirety.

What is claimed is:

1. An image recording apparatus configured to record an image, the image recording apparatus comprising:
a recording head in which a plurality of nozzles for ejecting ink is arrayed in an array direction;
a scanning unit configured to cause the recording head to relatively scan over a unit area on a recording medium a plurality of times, in a scanning direction that intersects with the array direction;
a conveying unit configured to convey the recording medium, in a conveying direction that intersects with the scanning direction, by a distance corresponding to a length of each of a plurality of nozzle groups in the array direction, in each interval of scans performed the plurality of times by the recording head caused to perform the scan by the scanning unit, each of the plurality of the nozzle groups being formed by dividing the plurality of nozzles in the array direction;
a generating unit configured to generate recording data, used for ejecting ink from nozzles in each of the plurality of nozzle groups during each of the scans which are performed a plurality of times on the unit area, on the basis of image data corresponding to the unit area and a plurality of mask patterns including a recording permitted pixel that permits recording and a recording non-permitted pixel that does not permit recording, each of the plurality of mask patterns corresponding to a different one of the plurality of nozzle groups in the scans performed the plurality of times; and
a controlling unit configured to control the ink to be ejected onto the unit area from the recording head on the basis of the recording data,
wherein an average of the numbers of the recording permitted pixels disposed adjacently to each another in a first area of a first mask pattern among the plurality of mask patterns is less than an average of the numbers of the recording permitted pixels disposed adjacently to each another in a second area, the second area being located at an end side of the first mask pattern in a direction corresponding to the array direction of the first mask pattern as compared to the first area and having the same size as the first area in the direction corresponding to the array direction, and
wherein a ratio of the recording permitted pixels to the recording non-permitted pixels disposed in the first area of the first mask pattern is substantially equal to a ratio of the recording permitted pixels to the recording non-permitted pixels disposed in the second area of the first mask pattern.

2. The image recording apparatus according to claim 1,
wherein an average of the numbers of the recording permitted pixels disposed adjacently to each another in a third area of a second mask pattern which is different from the first mask pattern among the plurality of mask patterns is less than an average of the numbers of the recording permitted pixels disposed adjacently to each another in a fourth area, the fourth area being located at an end side of the second mask pattern in a direction corresponding to the array direction of the second mask pattern as compared to the third area and having the same size as the third area in the direction corresponding to the array direction, and
wherein a ratio of the recording permitted pixels to the recording non-permitted pixels disposed in the third area of the second mask pattern is substantially equal to a ratio of the recording permitted pixels to the recording non-permitted pixels disposed in the fourth area of the second mask pattern.

3. The image recording apparatus according to claim 1,
wherein the average of the numbers of the recording permitted pixels disposed adjacently to each another in the first area of the first mask pattern is less than the average of the numbers of the recording permitted pixels disposed adjacently to each another in a third area located at an end side opposite to the second area side of the first mask pattern in the direction corresponding to the array direction in the first mask pattern as compared to the first area and having the same size as the first area in the direction corresponding to the array direction.

4. The image recording apparatus according to claim 3,
wherein the average of the numbers of the recording permitted pixels disposed adjacently to each another in the first area of each of the plurality of mask patterns is less than the average of the numbers of the recording permitted pixels disposed adjacently to each another in the third area of each of the plurality of mask patterns.

5. The image recording apparatus according to claim 3,
wherein the second area is located at an end side in the direction corresponding to the array direction in the first mask pattern, and
wherein the third area is located at another end side in the direction corresponding to the array direction in the first mask pattern.

6. The image recording apparatus according to claim 1, further comprising a heating unit configured to heat the recording medium.

7. The image recording apparatus according to claim 6, wherein the ink contains a resin emulsion.

8. The image recording apparatus according to claim 6, wherein the recording medium includes a base material and a layer on the base material, the layer being formed of polyvinyl chloride.

9. The image recording apparatus according to claim 1, wherein critical surface tension of a layer of the ink formed on the recording medium is different from critical surface tension of the recording medium.

10. The image recording apparatus according to claim 1, wherein the plurality of mask patterns includes at least first and second mask patterns,
wherein a position of the recording permitted pixel disposed in the first mask pattern corresponds to a position of the recording non-permitted pixel disposed in the second mask pattern, and
wherein a position of the recording permitted pixel disposed in the second mask pattern corresponds to a position of the recording non-permitted pixel disposed in the first mask pattern.

11. The image recording apparatus according to claim 1, wherein the first area is located at a center in the direction corresponding to the array direction of the first mask pattern.

12. An image recording apparatus configured to record an image, comprising:
a recording head in which a plurality of nozzles for ejecting ink is arrayed in an array direction;
a scanning unit configured to cause the recording head to relatively scan over a unit area on a recording medium a plurality of times, in a scanning direction that intersects with the array direction;
a conveying unit configured to convey the recording medium, in a conveying direction that intersects with the scanning direction, by a distance corresponding to a length of each of a plurality of nozzle groups in the array direction, in each interval of scans performed the plurality of times by the recording head caused to perform the scan by the scanning unit, each of the plurality of the nozzle groups being formed by dividing the plurality of nozzles in the array direction;
a generating unit configured to generate recording data, used for ejecting ink from nozzles in each of the plurality of nozzle groups during each of the scans which are performed a plurality of times on the unit area, on the basis of image data corresponding to the unit area and a plurality of mask patterns including a recording permitted pixel that permits recording and a recording non-permitted pixel that does not permit recording, each of the plurality of mask patterns corresponding to a different one of the plurality of nozzle groups in the scans performed the plurality of times; and
a controlling unit configured to control the ink to be ejected onto the unit area from the recording head on the basis of the recording data,
wherein dispersivity of the recording permitted pixels disposed in a first area of a first mask pattern among the plurality of mask patterns is less than dispersivity of the recording permitted pixels disposed in a second area that is located at an end side of the first mask pattern in a direction corresponding to the array direction of the first mask pattern as compared to the first area and that has the same size as the first area in the direction corresponding to the array direction, and
wherein a ratio of the recording permitted pixels to the recording non-permitted pixels disposed in the first area of the first mask pattern is substantially equal to a ratio of the recording permitted pixels to the recording non-permitted pixels disposed in the second area of the first mask pattern.

13. An image recording method for recording an image by ejecting ink onto a recording medium from a recording head in which a plurality of nozzles for ejecting the ink is arrayed in an array direction, the image recording method comprising:
scanning a plurality of times, using the recording head, relative over a unit area on a recording medium in a scanning direction intersecting with the array direction;
conveying the recording medium in a conveying direction intersecting with the scanning direction, by a distance corresponding to a length of each of a plurality of nozzle groups in the array direction, in each interval of scans performed the plurality of times by the recording head, each of the plurality of the nozzle groups being formed by dividing the plurality of nozzles in the array direction;
generating recording data used for ejecting ink from nozzles in each of the plurality of nozzle groups during each of the scans which are performed a plurality of times on the unit area on the basis of image data corresponding to the unit area and a plurality of mask patterns including a recording permitted pixel that permits recording and a recording non-permitted pixel that does not permit recording, each of the plurality of mask patterns corresponding to a different one of the plurality of nozzle groups in the scans performed the plurality of times; and
controlling the ink to be ejected onto the unit area from the recording head on the basis of the recording data,
wherein an average of the numbers of the recording permitted pixels disposed adjacently to each another in a first area of a first mask pattern among the plurality of mask patterns is less than an average of the numbers of the recording permitted pixels disposed adjacently to each another in a second area, the second area being located at an end side of the first mask pattern in a direction corresponding to the array direction of the first mask pattern as compared to the first area and having the same size as the first area in the direction corresponding to the array direction, and
wherein a ratio of the recording permitted pixels to the recording non-permitted pixels disposed in the first area of the first mask pattern is substantially equal to a ratio of the recording permitted pixels to the recording non-permitted pixels disposed in the second area of the first mask pattern.

14. A non-transitory storage medium storing medium storing a program that when executed, causes a computer of an image recording apparatus to implement the image recording method according to claim 13.

* * * * *